United States Patent [19]
Buchwalter et al.

[11] Patent Number: 5,932,682
[45] Date of Patent: *Aug. 3, 1999

[54] CLEAVABLE DIEPOXIDE FOR REMOVABLE EPOXY COMPOSITIONS

[75] Inventors: Stephen Leslie Buchwalter, Hopewell Junction, N.Y.; Joseph Paul Kuczynski; John Gregory Stephanie, both of Rochester, Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/574,806

[22] Filed: Dec. 19, 1995

[51] Int. Cl.$^6$ .................................... C08G 59/68

[52] U.S. Cl. .......................... 528/94; 528/112; 528/297; 525/504; 525/533

[58] Field of Search .................... 525/504, 533; 528/94, 112, 297

[56] References Cited

U.S. PATENT DOCUMENTS

| | | | |
|---|---|---|---|
| 2,896,462 | 7/1959 | Mottu | 74/334 |
| 3,023,174 | 2/1962 | Batzer et al. | 528/297 |
| 3,507,831 | 4/1970 | Avis et al. | 528/94 |
| 3,759,954 | 9/1973 | Batzer et al. | 260/340.7 |
| 3,879,422 | 4/1975 | Batzer et al. | 260/340.7 |
| 3,956,317 | 5/1976 | Batzer et al. | 260/340.7 |
| 4,153,586 | 5/1979 | Hockswender et al. | 260/18 EP |
| 4,159,221 | 6/1979 | Schuessler | 156/285 |
| 5,512,613 | 4/1996 | Afzali-Ardakani et al. | 523/443 |
| 5,560,934 | 10/1996 | Afzali-Ardakani et al. | 424/497 |

FOREIGN PATENT DOCUMENTS

| | | |
|---|---|---|
| 0 532 896 A2 | 3/1993 | European Pat. Off. . |
| 865340 | 4/1961 | United Kingdom . |

OTHER PUBLICATIONS

Maruno, T., et al., "Properties of a UV–curable, durable precision adhesive", Chemical Abstracts, 123(18):2 pages (Oct. 30, 1995).

Lee, H. and Neville, K. *Handbook of Epoxy Resins*, Capter 12 & Title Page Jan., 1968 Reissue.

March, J. *Advanced Organic Chemistry*, pp. 329–331, No Date Available.

Farkas, A. and Strohm, P. "Imidazolc Catalysis in the Curing of Epoxy Resins", *Journal of Applied Polymer Science*, vol. 12, pp. 159–168 (1968).

*Primary Examiner*—Randy Gulakowski
*Attorney, Agent, or Firm*—Karuna Ojanen; John J. Gresens; Matthew J. Bussan

[57] ABSTRACT

A cleavable epoxy resin composition suitable for encapsulating electronic chips and a method for making the composition comprises the cured reaction product of a diepoxide; a cyclic dicarboxylic anhydride curing agent mixture; a 1,3-diaza compound having two nitrogen atoms present with one nitrogen atom doubly bonded to the central carbon and singly bonded to one other carbon, and the other nitrogen atom singly bonded to the central carbon and singly bonded to another carbon and singly bonded to a hydrogen. The 1,3-diaza compound serves either as the sole catalyst or in combination with a tertiary amine catalyst different from the diaza compound. The composition may include an optional hydroxy functional compound capable of reacting with the cyclic anhydrides to form a half ester thereby initiating the reaction between the diepoxide and the cyclic dicarboxylic anhydride curing agent. The resin can be used for the encapsulation of electronic parts, but can be removed by a solvent. This feature allows electronic components to be recycled.

5 Claims, 4 Drawing Sheets n = 1-15

| $R_2$ | $R_4$ | $R_5$ | |
|---|---|---|---|
| H | H | H | imidazole |
| $C_2H_5$ | $CH_3$ | H | 2-ethyl-4-methylimidazole |
| $CH_3$ | H | H | 2-methylimidazole |
| H | H | $CH_3$ | 5-methylimidazole |
| H | $CH_3$ | H | 4-methylimidazole |
| $C_2H_5$ | H | H | 2-ethylimidazole |

$R_2$, $R_4$, and $R_5$ may be H, alkyl or substituted alkyl, alkoxyalkyl, aryl, substituted aryl, alkylaryl.

CLEAVABLE DIEPOXIDE FOR REMOVABLE EPOXY COMPOSITIONS

CROSS-REFERENCE TO RELATED APPLICATION

This patent application is related to U.S. Ser. No. 08/210,879 filed Mar. 18, 1994, entitled "Cleavable Diepoxide for Removable Epoxy Compositions" which is hereby incorporated by reference and which has been assigned to the assignee herein.

FIELD OF THE INVENTION

The present invention generally relates to a chemical compound to be used as an epoxy. More particularly, the invention relates to a cleavable epoxy resin composition which can be used as coatings, adhesives, structural components, and encapsulants for electronic chips mounted onto substrates. Because the epoxy is cleavable, individual components that have been encapuslated with the epoxy can be replaced.

BACKGROUND OF THE INVENTION

Epoxy resins are thermoset plastics for coatings, adhesives, structural materials, electrical insulation, encapsulants, etc. Epoxy resins are particularly well suited to protect electronic devices in packaging. Epoxies are applied in unreacted or partly reacted form, which means that the viscosity of the material can be quite low, providing ease of processing and good wetting of device surfaces. Curing of the material at some moderate temperature then generates the rigid epoxy matrix desired for device protection. Filler additives are generally included in the matrix to reduce the coefficient of thermal expansion (CTE) of the cured material to minimize stresses induced by the difference in expansion of the plastic and the device during thermal cycling. As described in Lee, H., and Neville, K., *Handbook of Epoxy Resins*, McGraw Hill (1967), fully cured epoxy resins, with or without filler, are heavily crosslinked insoluble network polymers. As thermosetting compositions, the epoxy materials are difficult or impossible to remove after curing. As a result, removal of such epoxy materials from electronic packages without damage to the circuitry or devices has been and is virtually impossible.

Epoxy encapsulants are particularly valuable for reinforcement of solder joints against thermal fatigue and encapsulation of wire bonded chips. For these applications, stability to ambient moisture is essential because degradation of the encapsulant cannot be tolerated. A severe limitation of the epoxy reinforcement for the solder joints and encapsulation of wire bonded chips, however, is the fact that cured epoxy resins are insoluble and infusible, which means that the reinforced solder joints and wire bonds cannot be reworked. The inability to replace one defective component on a microelectronic assembly renders all the other valuable components on that assembly useless, thus, the non-reworkability of conventional epoxy materials is a severe limitation on their applicability for solder reinforcement or encapsulation of wire bonds.

Another attribute of the epoxy thermosets is their intractability after curing. Curing converts the epoxy thermosets from low molecular weight precursors to a network polymer of essentially infinite molecular weight. Previously considered an asset, the intractability of thermosets has become a liability because of concerns about their longevity in the environment. Many manufacturers are either voluntarily or by government regulation taking responsibility for disposing or recycling their products. Intractable thermosets are not compatible with the concept of design for disassembly and recycling, whether the epoxies are used as structural components, adhesives, or encapsulants. As demand increases for recyclable products, thermosets designed for disassembly on the molecular scale having cleavable diepoxide materials may well offer a means of maintaining the utility of thermoset materials.

U.S. Pat. No. 3,023,174 to Batzer et al., owned by the assignee herein, and British Patent 865,340 disclose compositions based on diepoxides having linear ketal or acetal linkages. There is no mention of the possible utility of such diepoxides with respect to cleavability in dilute acid as disclosed in the present invention. In fact, stability of the cured ketal diepoxide in strong acid is specifically mentioned. U.S. Pat. No. 2,896,462 discloses diepoxides containing cyclic acetal groups, which although expected to be sensitive to degradation by acids, are in fact surprisingly resistant to acids.

U.S. Pat. No. 4,153,586 refers to reaction products of epoxides which are not suitable for curing to rigid matrices by reaction with crosslinking agents such as cyclic anhydrides. Although this patent discloses ketal and acetal diepoxides there is no mention of cleavability of the epoxides or their utility as a removable cured epoxy material.

U.S. Pat. Nos. 3,759,954; 3,879,422 and 3,956,317 all disclose compositions of matter covering diepoxides containing one or more cyclic acetals and ketals but there is no mention of cleavability of the epoxides nor of their utility in epoxy compositions that are removable after curing. The compounds are cured to epoxy matrices which are not cleavable.

U.S. Pat. No. 4,159,221 discloses a method to hermetically seal an electronic circuit package. The reference discloses that the sealant used is an epoxy which is asserted to be readily soluble after being cured. A partially cured epoxy, such as is disclosed in the reference, may be soluble but will not possess the physical properties needed to reinforce solder interconnections and/or wirebonds.

SUMMARY OF THE INVENTION

Thus, there exists a need which has been provided by the present invention for the combination of a high viscosity of an epoxy precursor mixture, a high modulus, and a low CTE of the cured matrix which has been found to be advantageous for an important device protection application. A particularly useful embodiment is the protection of wirebond interconnections of chips to ceramic, epoxy-glass or other substrates. The high viscosity precursor mixture efficiently and completely encapsulates the wirebonds and envelopes all interconnections with epoxy but prevents the mixture from flowing off the wirebonds onto the substrate. Cured epoxy generally provides protection of the wirebonds from physical and environmental damage. The epoxy is removable to allow rework of a single chip in a microelectronic assembly so wide application of this encapsulation method is expected.

The present invention incorporates a cleavable link in the diepoxide monomer which allows the thermoset network to be broken down in special solvents. This improvement allows the epoxy to be removed for repair, replacement, recovery, or recycling of the article of which the epoxy is a part. For example, in encapsulation of electronic chips, testing the chips to ascertain that the product satisfies the manufacturing specification and, if needed, removing the chips for rework by dissolving the epoxy without destroying the chip or substrate.

The solvent system used to remove the cured diepoxide is another aspect of the present invention. While the solvent system dissolves the cured cleavable diepoxide compositions, it does not degrade other materials such as the copper wiring or the insulating dielectric material of printed circuit cards. The solvent systems used in accordance with the present invention provide an epoxy removal process compatible with manufacturing and environmental concerns.

Thus, the present invention discloses a means of achieving a crosslinked epoxy matrix maintaining all the advantages of previously known epoxy materials that is also easily removable if the need arises. Pursuant to the present invention, a straightforward synthesis is carried out to prepare a diepoxide having linear ketal or acetal linkages. The invention thus comprises a cured diepoxide composition and a method for synthesizing the composition, the composition of which is capable of being readily cleaved and removed in acid-containing solvents, comprising the reaction product of: a diepoxide in which an organic linking moiety is the connection between the two epoxy groups of the diepoxide includes an acyclic acetal group; a cyclic dicarboxylic anhydride curing agent mixture of cyclic dicarboxylic anhydride curing agents present at a concentration such that the anhydride/diepoxide ratio of equivalents is less than or equal to 0.90; a 1,3-diaza compound having two nitrogen atoms present with one nitrogen atom doubly bonded to the central carbon and singly bonded to one other carbon, and the other nitrogen atom singly bonded to the central carbon and singly bonded to another carbon and singly bonded to a hydrogen, in which the 1,3-diaza compound serves as either the sole catalyst or in combination with a tertiary amine catalyst which is different from said diaza compound. The invention also comprises a method of coating, protecting, encapsulating, reinforcing, assembling, or fabricating a device, an article of commerce or a chemical product with a cured diepoxide composition which is capable of undergoing controlled degradation in the environment or of being readily cleaved and removed in solvents, wherein the epoxy composition comprises the reaction product of: a diepoxide in which the connection between the two epoxy groups of the diepoxide includes a cleavable linear acetal group; a cyclic dicarboxylic anhydride curing agent; a catalyst; and a hydroxy functional initiator.

DESCRIPTION OF THE INVENTION

Cycloaliphatic epoxides are a class of epoxy resins particularly useful for a variety of applications including electrical insulation, potting, encapsulation, coatings, etc. They are generally formulated with a cyclic anhydride curing agent such as hexahydrophthalic anhydride (HHPA), which reacts with the epoxy in the presence of an amine catalyst to form a thermoset network during thermal curing. Because this network extends to macro-scale dimensions, it is insoluble and infusible, i.e. intractable.

The present invention is based on the recognition that the intractability of the cured epoxy network may result from the tetrafunctional nature of the diepoxide starting material in its reaction with the difunctional cyclic anhydride. If the epoxide was only difunctional as would be the case with a monoepoxide, reaction with the difunctional anhydride could only form a linear polymer not a highly crosslinked network polymer. Thus, the link between the two epoxy groups of the diepoxide is responsible for the network formation; and cleavage of such links would convert the network immediately to a collection of small molecules, which would be soluble. The diepoxide forms a network of macro-scale dimensions with a difunctional hardener such as a cyclic anhydride. Without degradation, such a network cannot dissolve in any solvent. If the two epoxy groups of the diepoxide can be connected by a cleavable bond or link, then cleavage of such links would convert the network immediately to a collection of small molecules, which will be soluble.

In searching for appropriate structures that can serve as links for the diepoxide, the following criteria are important: (1) the link should be stable under conditions to which the cured matrix would normally be exposed; (2) the link should be sufficiently stable to permit the network to perform its function in a specific application; (3) the link should be readily cleaved under specific conditions; (4) the link should be unreactive in the curing reaction of the epoxy matrix; and (5) a practical synthesis of the diepoxide containing the link should be available.

Figure 1:
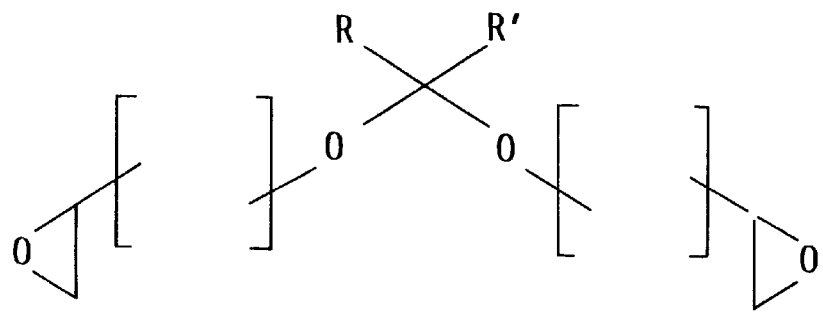
FIG. 1 is the generalized structure of diepoxide containing linear ketal or acetal links.
Figure 2:
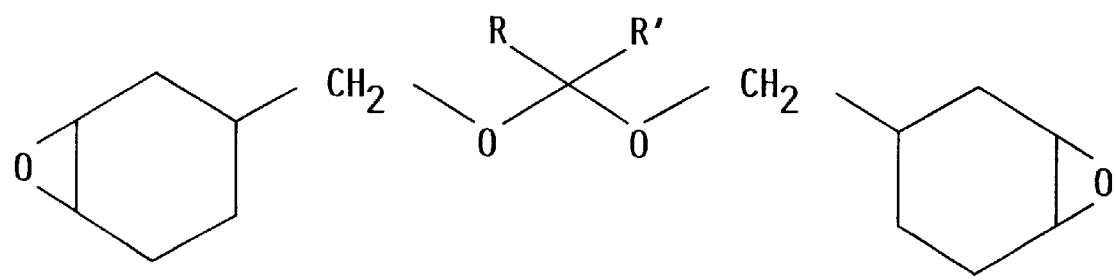
FIG. 2 is the preferred structure of diepoxides containing linear acetal and ketal links.
Figure 3A:
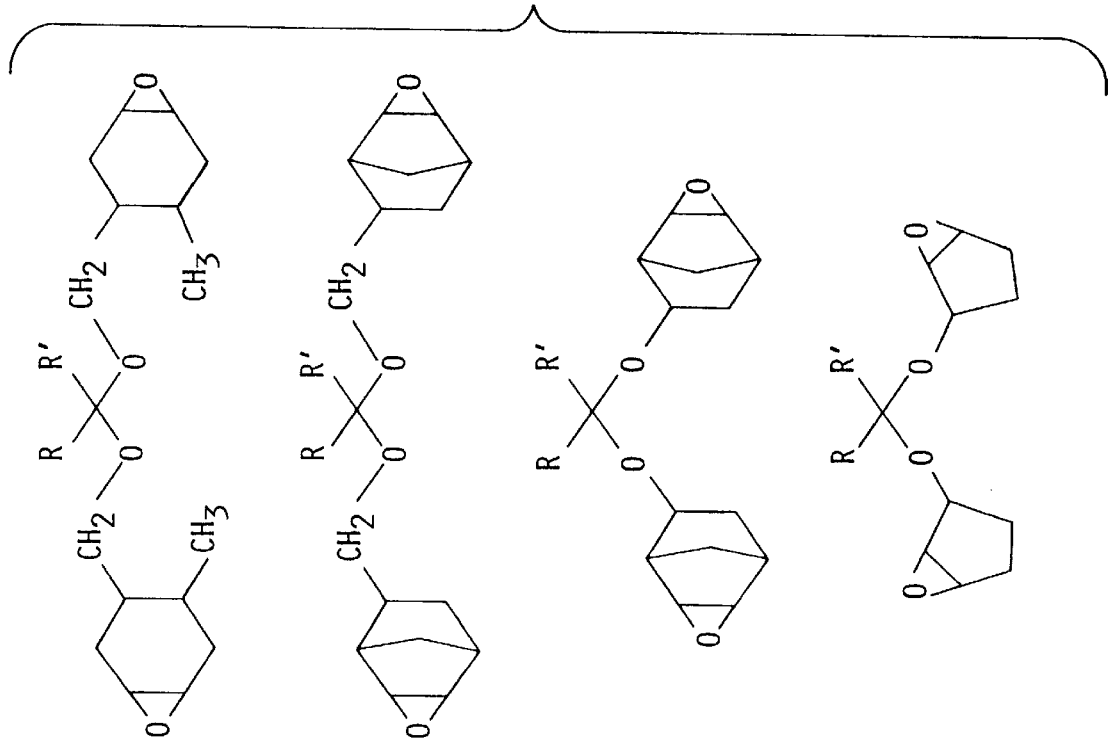
FIG. 3 depicts various diepoxides that can be used in accordance with the present invention.
Figure 3A:
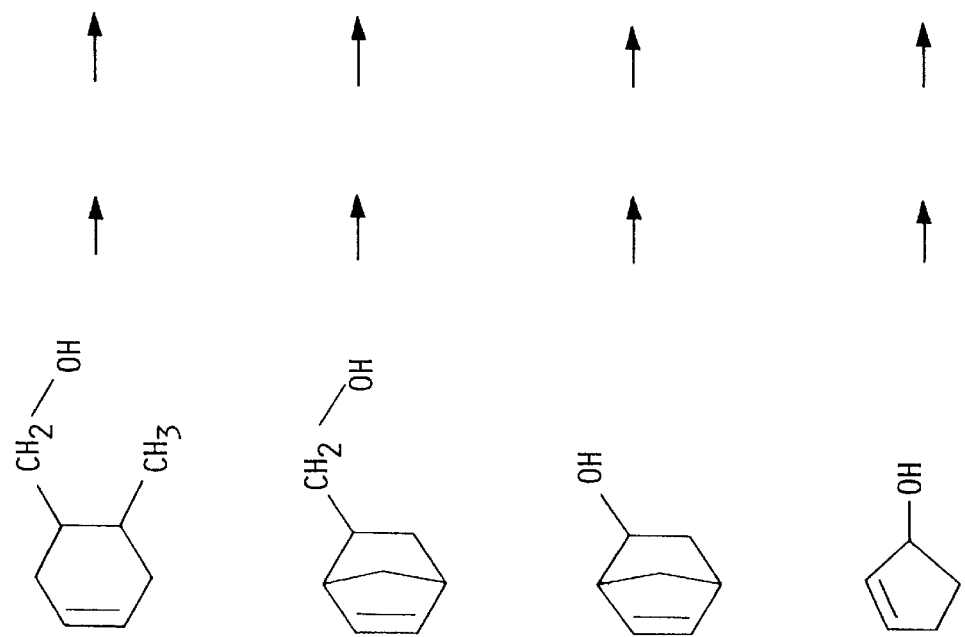
Figure 3B:
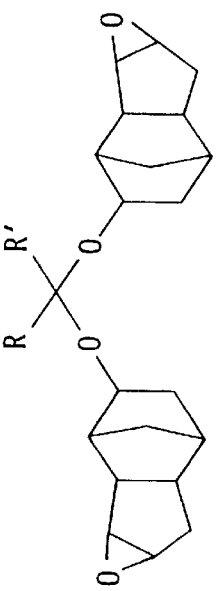
Figure 3B:
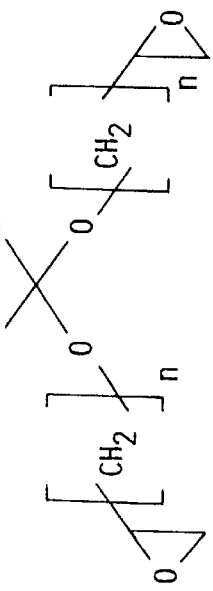
Figure 3B:
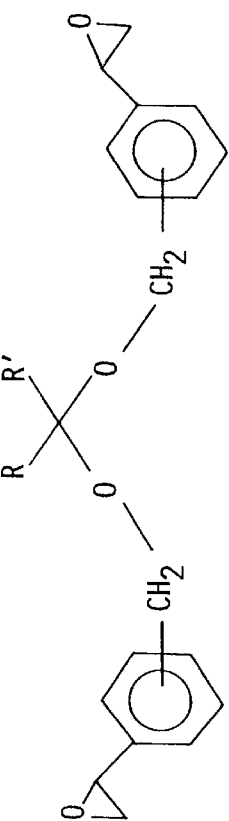
Figure 3B:
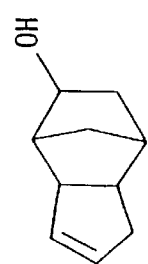
Figure 3B:
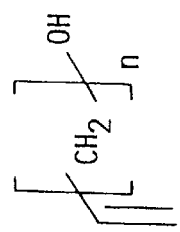
Figure 3B:
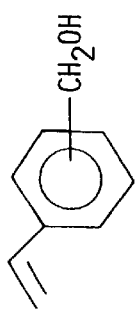

The ketal and acetal groups have been identified as candidates meeting the above criteria For the purposes of this invention, the term "acetal" refers to the 1,1-dialkoxy group as depicted in FIGS. 1–3 where R and R' can be alkyl, aryl, aralkyl or hydrogen. The general use of the term "acetal" includes ketals where R and R' is equivalent to alkyl, aryl, or aralkyl; acetals where R is equivalent to alkyl, aryl or aralkyl and R'=H and formals where R and R'=H.

As disclosed in March, J. *Advanced Organic Chemistry* (3d ed.), Wiley Interscience 329–331 (1985), the known organic chemistry of ketals and acetals indicates that they are exceedingly stable to hydrolysis in the absence of acids, but break down readily in acid, even weak acids. Ketals and acetals are not subject to reactions similar to those of epoxy groups, and thus an acetal or a ketal link should not be affected by the curing reaction of the epoxy matrix. Acetals can be hydrolyzed in acidic aqueous solutions, but they are also susceptible to trans-etherification under acidic conditions. Because the network fragments are organic solvent-soluble and not water-soluble, it has been found that the best solvents for dissolution of the cleavable networks are those containing an alcohol and some organic acid such as methanesulfonic acid or p-toluenesulfonic acid. It then becomes possible to use an alcohol as both the solvent and the reactant which eliminates the necessity of adding water.

Control of the degradability/stability of the compositions with respect to ambient moisture is achieved, pursuant to the present invention, by using three variables in the formulation. First, the structure of the cleavable link can be varied to adjust the stability of the link to hydrolysis. The rate of hydrolysis of acetals is affected by the substituents on the central carbon of the acetal. Considering for illustration purposes only methyl and hydrogen substituents, the formal, with two hydrogens on the central carbon is slowest to hydrolyze; the acetal, with one hydrogen and one methyl, hydrolyzes considerably more easily; and the ketal, with two methyls, hydrolyzes the fastest of the three. By choosing diepoxides linked by formal, acetal, and ketal groups, or by choosing some mixture of these; the formulator can adjust the degradability of the resulting thermoset network to match the requirements of his application. For some applications, addition of conventional, non-cleavable diepoxides such as 3,4-epoxycyclohexylmethyl 3,4-epoxycyclohexanecarboxylate or bis-phenol A diglycidyl ether, may be advantageous.

The second variable in the formulation controlling stability is the ratio of cyclic anhydride to epoxy. If this ratio, on an equivalence basis, is less than 0.90, the stability against moisture is markedly enhanced. After the curing reaction is complete, any unreacted anhydride will readily hydrolyze in the presence of moisture to generate carboxylic acid. This acid in the network will catalyze the cleavage of the acetal links, leading to relatively rapid degradation of the network by moisture. By using an excess of the diepoxide, all traces of anhydride are reacted, leaving none to generate acid and catalyze the degradation.

The third variable in the formulation controlling the stability is the amount of the 1,3-diaza compound used as a catalyst, as measured by its ratio to the epoxy in the formulation. The stability against moisture is markedly enhanced if ratio is less than 0.033, on an equivalence, basis.

Lowering the anhydride level in the cycloaliphatic epoxide formulation means that the mixture is out of stoichiometric balance, with excess epoxy groups. Without any further changes, the network will be lower in crosslink density and hence considerably lower in glass transition temperature (Tg). For applications which require both high moisture stability and a high Tg, such as for example, microelectronic encapsulation or solder joint reinforcement, a means of raising the Tg of formulations containing an anhydride/epoxy ratio of less than 0.90 is needed.

Certain 1,3-diaza compounds are especially effective in promoting epoxy—epoxy reactions, thereby increasing the crosslink density and Tg of formulations with anhydride/epoxy ratios of less than 0.90. In U.S. patent application Ser. No. 08/210,879, 1,3-diaza compounds connecting the two nitrogens and in which the second nitrogen is a tertiary amine were disclosed to raise the Tg of cured epoxy compositions with less than stoichiometric amounts of anhydride. The increase in Tg of twenty to thirty degrees Celsius in comparison to similar compositions containing conventional tertiary amine catalysts was noted. The compositions disclosed in the Ser. No. 08/210,879 application were 1,3-diaza compounds in which neither nitrogen was bonded to hydrogen, because it was believed that hydrogen bound to nitrogen in such compounds would inhibit their activity in promoting epoxy—epoxy reactions and raise the Tg. But 1,3-diaza compounds in which one nitrogen is doubly bonded to the carbon connecting the two nitrogens and the second nitrogen is a secondary amine, i.e., bonded to one hydrogen, are even more effective at catalyzing epoxy—epoxy reactions and raising the Tg. Increases in Tg of ten to twenty degrees Celsius have been observed using the 1,3-diaza compounds of the present invention compared to the 1,3-diaza compounds previously disclosed. For many applications, including especially microelectronic encapsulation, higher Tg is particularly advantageous in order to provide the mechanical properties needed. The compounds effective as catalysts in raising the Tg of formulations containing anhydride/epoxy ratios less than 0.9 are those 1,3-diaza compounds in which one nitrogen is doubly bonded to the carbon connecting the two nitrogens and in which the second nitrogen is a secondary or tertiary amine. The 1,3-diaza structure can be part of a cyclic or a bicyclic structure. Examples include imidazole; 2-ethyl-4-methylimidazole; 2-methylimidazole; 5-methylimidazole; 4-methylimidazole; 2-ethylimidazole.

The invention described herein is the family of epoxy compositions which are removable in certain solvents because of the cleavable acetal link connecting the epoxy groups and which have high Tg because of the use of certain 1,3-diaza compounds as catalysts. The utility of these compositions depends on both their cleavability and their high Tg.

The ketal and acetal diepoxides of the present invention are synthesized and then mixed with a cyclic anhydride, an amine promoter, and, optionally, a hydroxy functional initiator, a flexibilizer and/or an inorganic filler. The ketal/acetal diepoxide structure is shown in FIG. 1, in which R and R' can be any combination of hydrogen, methyl, ethyl, propyl, iso-propyl, butyl, iso-butyl, other alkyl, phenyl, benzyl, substituted phenyl or substituted benzyl. Substituents on the phenyl or benzyl can be at one or more of the available aromatic positions and can be a halogen such as chlorine, bromine, or fluorine, a nitro group, any alkyl group such as methyl, ethyl, or isopropyl, an alkoxy group such as methoxy, ethoxy, or isopropoxy, an acyl such as acetyl or benzoyl, or any of the family of aromatic substituent groups well known in organic chemistry. In addition to the structure of FIG. 1, the diepoxide can be any diepoxide in which the two epoxide groups are connected by an acetal or ketal as in FIG. 2, in which R and R' are as in FIG. 1. The preferred diepoxide structure is acetaldehyde bis-(3,4-epoxycyclohexylmethyl) acetal (more conveniently known as acetal diepoxide).

The epoxy structures suitable for use in this invention are those derived from olefinic alcohols. The alcohol functionality preferably is an aliphatic primary or secondary alcohol group, most preferably a primary alcohol group. The olefinic functionality is preferably an aliphatic double bond, most preferably a mono-substituted or a 1,2-disubstituted double bond, and must be suitable for epoxidation with an epoxidation reagent known in the art, such as peracetic acid, perbenzoic acid, metachloroperbenzoic acid, potassium peroxymonosulfate, and the like. Alternative olefinic alcohols and the acetal or ketal diepoxides derived from them are shown in FIG. 3, in which R and R' are as in FIG. 1.

The cyclic anhydride can be any of the well known anhydride curing agents, see, e.g., H. Lee and K. Neville, *Handbook of Epoxy Resins*, McGraw-Hill, Chapter 12 (1967), including hexahydrophthalic anhydride, methylhexahydrophthalic anhydride, nadic methyl anhydride, and maleic anhydride, etc. For microelectronic applications, the preferred compositions will have anhydride/epoxy equivalence ratios of 0.90 or less to minimize degradation by moisture.

The hydroxy functional initiator can be any high boiling alcohol or polyol, such as ethylene glycol, diethylene glycol or the like. Optionally the flexibilizer can serve as the hydroxy functional initiator, by using a polyether diol such as polyethylene glycol, polypropylene glycol, poly(caprolactone)diol or poly(oxybutylene)diol. When using an imidazole catalyst with a secondary hydrogen, it has been found that a hydroxy functional initiator does not have to be used to obtain excellent crosslinking.

Figure 4:
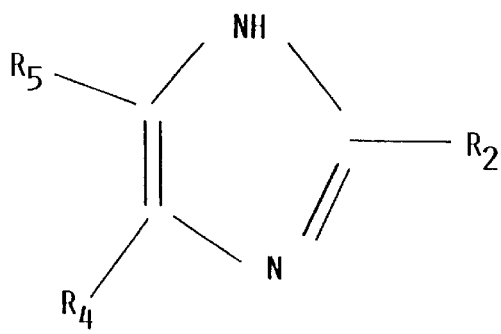
FIG. 4 depicts various 1,3-diaza compounds be used as catalysts in the invention.

The amine promoter can be any tertiary amine or aromatic amine such as benzyldimethylamine, triethylamine, pyridine, imidazole, propoxylated imidazole, 1,4- diazabicyclo[2.2.2]octane, and the like. Most preferably, for microelectronic applications, the preferred amine promoters are those which will raise the Tg of the moisture-stable formulations, for example, the 1,3-diaza compounds of FIG. 4.

Encapsulants are commonly filled with an inorganic powder to reduce the coefficient of thermal expansion. The optional inorganic filler can be any of the powdered solids known in the art, such as alumina, silica, zinc oxide, talc, etc. For microelectronic applications, the preferred filler is a highly purified form of silica with particle size of 25 microns or less. The amount of filler may vary but is preferred in the range 50–72% on a weight basis.

The optional flexibilizer can be any of the well known materials used for this purpose such as the Union Carbide ERL-4350, LHT-34 or LHT-240 or the B. F. Goodrich butadiene-acrylonitrile copolymers sold under the tradename HYCAR. In addition, any polyetherdiol or polyesterdiol can be used as a flexibilizer including polyethylene glycol, polypropylene glycol, poly(caprolactone)diol, or poly(oxybutylene)diol. A preferred flexibilizer is one which does not significantly depress the glass transition temperature of the formulation, such as the maleic anhydride adducts of polybutadiene resins sold by Ricon Resins as R-130.

The epoxy formulations are cured by heating at 90–200° C. for one to six hours, preferably 100–150° C. for about two hours to form a hard tack-free solid. The preferred curing schedule includes a gel cure for about one hour at 80–100° C., followed by a post-cure of about two hours at 135–165° C. It is important that the cured resin resulting from the cleavable diepoxide not be adversely affected by the environment to which it is likely to be exposed. Under the long-term exposure to elevated temperature and humidity (85° C./85% RH), the ketal diepoxide formulation showed significant softening. The corresponding acetal diepoxide (FIG. 1, R=methyl, R'=hydrogen) formulation was unchanged after four weeks in elevated temperature and humidity testing.

After curing, the cleavable diepoxide formulations can be dissolved by hydrolysis or transetherification of the cleavable link, which is an acetal group connecting two cycloaliphatic epoxy groups. Acetals and ketals are generally easily cleaved in aqueous acid, but in order to dissolve the matrix an organic solvent is also needed. Many mixtures of organic solvents, acid or acids, and water can be used. For the purposes of this invention, suitable acids include organic acids such as acetic acid, propionic acid, chloroacetic acid, benzoic acid and the like; sulfonic acids such as benzenesulfonic acid, p-toluenesulfonic acid, methanesulfonic acid and the like; inorganic acids such as sulfuric acid, phosphoric acid, hydrochloric acid, and the like; and Lewis acids such as boron trifluoride etherate, aluminum chloride, stannic chloride and the like. These structures are exemplary only and are disclosed to illustrate the type of solvents and acids to be used. The preferred acids are methanesulfonic acid and p-toluenesulfonic acid. The following mixtures are given only as examples.

The temperature of the solvent mixture can be 25° C. or above, but for most rapid dissolution the solvents should be heated to boiling or near boiling. One useful mixture is that of ethanol, acetic acid, and water which is particularly effective in dissolving the cured formulations based on the ketal diepoxide. Other suitable solvent mixtures include a combination of gamma-butyrolactone, water, and phosphoric acid and a combination of butanol, acetic acid and water. Acetals and ketals are also susceptible to trans-etherification under acidic conditions. Thus it becomes possible to use an alcohol as both the solvent and the reactant, removing the necessity of adding water to the system thereby reducing the likelihood of corrosion of metallic components of the device. For example, a mixture of ethanol and an organic acid such as benzenesulfonic acid, para-toluenesulfonic acid, or methanesulfonic acid can be used to dissolve the cured epoxy based on the acetal diepoxide. Transetherification using a primary alcohol such as ethanol and an organic acid such as methanesulfonic acid is faster than hydrolysis in aqueous acid. An even faster dissolution rate was obtained by the incorporation of a portion of a less polar organic solvent such as xylene or benzyl alcohol or by the use of trifluoroethanol instead of ethanol.

The solvent used in accordance with the present invention comprises 10–100 parts, preferably about thirty parts, of a primary alcohol as exemplified by: ethanol, methanol, n-butanol, and n-propanol; 0–90 parts, preferably about thirty parts, of a less polar organic solvent as exemplified by: benzyl alcohol, xylene, toluene; and one to ten parts, preferably about three parts of an organic acid as exemplified by: methanesulfonic acid, p-toluenesulfonic acid and trifluoromethanesulfonic acid. Additionally, about thirty parts of ethylene glycol is used in the solvent. Optionally the solvent includes a surfactant and/or a corrosion inhibitor.

Even at refluxing temperatures, the alcohols are also very benign with respect to attack of the dielectric matrix used in circuitry such as FR4 epoxy. For example, a mixture of ethanol and an organic acid such as benzenesulfonic acid, para-toluenesulfonic acid, or methanesulfonic acid can be used to dissolve the cured epoxy based on the acetal diepoxide.

EXAMPLE 1

Starting with the preparations described as Examples 3, 4 of U.S. patent application Ser. No. 08/210,879 filed Mar. 18, 1994, this example provides curing studies. The Union Carbide cycloaliphatic diepoxide ERL-4221 (1.00 gram measured epoxy equivalent weight 70.5) was mixed with melted hexahydrophthalic anhydride (0.700 gram) and imidazole (0.0175 gram). After thoroughly mixing the three components, silica powder (NYACOL, 3.2 gram, 65% by weight) was blended into the mixture until the mixture was smooth. It was dispensed into two teflon bar molds containing six 40×10×1.5 mm cavities. One set of samples was cured at 150° C. for three hours and the second set was gelled at 80° C. for one hour and then cured at 150° C. for two hours. The bars were hard tack-free solids, as expected for a fully cured epoxy resin. A dynamic mechanical analyzer (DMA) run exhibited a modulus peak with a maximum at 164° C. for the gelled sample and 175° C. for the cured sample.

The acetal diepoxide (1.00 gram) was also mixed with the anhydride (0.07 gram), imidazole (0.0175 gram) and silica. The curing behavior was quite similar, hard and tack-free with a modulus peak at 140° C. for the sample cured at 150° C. for three hours.

EXAMPLE 2

Formulations based on acetal diepoxide with anhydride/epoxy ratios less than 0.95 have low Tg's using benzyldimethyl amine as catalyst. Imidazole catalysts, known to catalyze epoxy—epoxy reactions resulting in high Tg's (see, Farkas, A. and Strohm, P. F., 12 *J APPL. POLYMER SCI.* 159–168 (1968)), were used to make cleavable epoxies.

Example 2A. Acetal diepoxide, 100 parts by weight, was mixed with 70 parts of pre-melted hexahydrophthalic anhydride (HHPA anhydride/epoxy=0.66) and 7 parts imidazole (imidazole/epoxy=0.13). To the clear solution was added 65% by weight of silica powder and the formulation was thoroughly mixed. The homogeneous mixture was loaded into a teflon bar mold containing six 40×10×1.5 mm cavities. The samples were cured at 150° C. for three hours.

Example 2B. A sample was prepared by exactly the same procedure as 2A except 1.75 parts of imidazole (imidazole/epoxy=0.033) was used.

Example 2C. A sample was prepared by exactly the same procedure as 2B except 80 parts of acetal diepoxide and 20 parts of 3,4-epoxycyclomethyl 3,4-epoxycyclohexanecarboxylate (Union Carbide ERL-4221) was used instead of the 100 parts acetal diepoxide.

Example 2D. A sample was prepared by exactly the same procedure in 2C except 70 parts of acetal diepoxide and 30 parts of ERL 4221 were used.

Example 2E. A sample was prepared by the same procedure in 2D except the formulation was gelled at 80° C. for one hour and cured at 150° C. for two hours.

Example 2F. The commercial cycloaliphatic epoxide, 3,4-epoxycyclomethyl 3,4-epoxycyclohexanecarboxylate (Union Carbide ERL-4221) was used to prepare a similar sample for comparative purposes. The composition was 100 parts ERL-4221, 70 parts HHPA, 7 parts imidazole, 10 parts flexibilizer and 65% silica.

EXAMPLE 3

The moisture stability of the cured epoxy samples was investigated by placing the samples into a constant temperature/humidity chamber at 85° C. and eighty-five percent relative humidity (T/H) for various times. After T/H exposure, the samples were monitored for evidence of degradation using dynamic mechanical analysis. The acetal samples of 2A–2F were subjected to T/H. Comparison of mechanical properties was made to the unexposed samples by measuring flexural modulus vs. temperature for both exposed and unexposed samples.

After one week T/H, Sample 2A showed a marked drop in Tg from 174° C. to 126° C., and an order of magnitude decrease in modulus above Tg. After 24 hours at 100° C. under vacuum, the Tg did increase to 138° C., still well below the initial reading. This decrease is larger than what you would expect for reversible plasticization by absorbed water.

Sample 2B in contrast showed only a 15° C. decrease, 140° C. to 125° C., after one week T/H. However, after 24 hours at 100° C. under vacuum, the Tg increased to 140° C., equal to its original value.

Sample 2C in which the acetal diepoxide was reduced and ERL 4221, a non-cleavable diepoxide added, exhibited a 20° C. decrease, 150° C. to 130° C. after one week T/H. The Tg increased by 19° C. after heating 24 hours at 100° C.

Sample 2D also showed a decrease of 19° C. in Tg after one week T/H, which also was reversible. In this case the plasticization caused an initial decrease in Tg to 134° C. and on heating at 100° C. for 24 hours the Tg increased to 146° C.

Comparative sample 2F, which contained no cleavable diepoxides but had the large amount of imidazole, similar to Sample 2A, showed a 75° C. decrease in Tg after one week T/H. Heating at 100° C. for 24 hours resulted in only a partial recovery of the Tg.

A design matrix showed that, by far, the significant factor in T/H degradation, when imidazole is used as a catalyst, is the level of imidazole. If the imidazole/epoxy ratio is kept low, 0.033 in these examples, a Tg of 150° C. can be obtained with no mechanical degradation of the encapsulant.

EXAMPLE 4

Removal of the resins derived from the cleavable diepoxides was accomplished by exposing samples of the mixtures cured in Example 1 to a number of solutions. Cured samples of the mixture containing the Union Carbide ERL 4221 were also exposed at the same time as a control. A solution containing a 1:1:1 volume ration of ethylene glycol, n-butyl alcohol and xylene containing 0.3 M MSA (methane sulfonic acid) was heated to 105° C. The cured acetal diepoxide and the ERL-4221 were immersed in this solution while stirring with a magnetic stirrer. After six minutes complete dissolution of the acetal diepoxide had occurred (about 35 mg/min). The control sample was unchanged.

Samples from Example 1 were also subjected to 0.3 M MSA in 1:1 ethylene glycol and n-butanol at 85° C. The acetal diepoxide had a dissolution rate of 29 mg/min. and the control was unchanged. In pure ethylene glycol and 0.3 MSA, the rate of dissolution of the acetal diepoxide is about 14 mg/min.

Samples 2A to 2E dissolved in four to six minutes in a solution of 0.3M MSA in equal volume amounts of n-butyl alcohol, ethylene glycol and xylene at a temperature of 105 degrees Celsius.

EXAMPLE 5

A formulation similar to that of Examples 2A to 2E were prepared except ten parts of Polymer 35 flexibilizer was added. The Tg of the cured samples was about 10° C. lower than the Tg for the samples as described in Examples 2A to 2E. No change was observed after two 5 weeks T/H. The samples were also soluble in solvents of Example 4.

EXAMPLE 6

A formulation similar to that of Example 2B was prepared except silica filler (fine particle size, PQ Corporation) was added to the level of 65% by weight. Stability in T/H and dissolution in the various solvents disclosed in Example 4 was essentially unchanged.

EXAMPLE 7

A formulation similar to that of Example 6 is prepared and charged into plastic syringes. After degassing under vacuum, the syringes are frozen at −40° C. until use. After thawing to room temperature, the epoxy is dispensed under slight pressure through a needle to the periphery of wire bonds attached to silicon chips to an epoxy printed circuit board. The board is preheated to about 80° C. to facilitate flow of the filled epoxy to completely surround the wire bonds. After the epoxy has been applied to all devices on the substrate and flow is complete, the substrate is transferred to an oven and the epoxy is cured at 80° C. for one hour and then 150° C. for two hours.

As necessary for replacement of defective or obsolete chips on the substrate, the epoxy is removed by immersing the substrate in a hot mixture of n-butanol, xylene, and ethylene glycol, and MSA preferably excluding air. Once all the epoxy is removed, the substrate is carefully rinsed in pure isopropyl alcohol, again preferably excluding air.

EXAMPLE 8

Using an epoxy formulation similar to that of Example 7, chips directly mounted on a printed circuit card by flip chip attach or by wire bonds are encapsulated in globtop fashion. After curing as previously, the printed circuit cards are ready for shipment.

For purposes of replacement of defective or obsolete components or to facilitate removal of lead-containing solder prior to disposal of the printed circuit assembly, the epoxy is easily removed as in Example 7.

EXAMPLE 9

During microanalysis of various mechanical and electrical devices, a variety of electronic devices are routinely mounted in an epoxy potting compound and then subjected to cutting and polishing to expose a particular surface of the device for detailed optical and scanning electron microscopy. Recovery of the part for further analysis of other surfaces was virtually impossible with conventional epoxy potting compounds. Using the present invention technique, a formulation based on the ketal or acetal diepoxide as described in Example 2A to 2E allows removal of the potting compound as described in Example 4.

What is claimed is:

1. A cured diepoxide composition which is capable of being readily cleaved and removed in acid-containing solvents, consisting essentially of the reaction product of: a diepoxide in which an organic linking moiety is the connection between the two epoxy groups of the diepoxide includes an acyclic acetal group; a cyclic dicarboxylic anhydride curing agent or mixture of cyclic dicarboxylic anhydride curing agents present at a concentration such that the anhydride/diepoxide ratio of equivalents is less than or equal to 0.90; a 1,3-diaza compound having two nitrogen atoms present with one nitrogen atom doubly bonded to the central carbon and singly bonded to one other carbon, and the other nitrogen atom singly bonded to the central carbon and singly bonded to another carbon and singly bonded to a hydrogen, said 1,3-diaza compound serving either as the sole catalyst or in combination with a tertiary amine catalyst which is different from said diaza compound.

2. The diepoxide composition as defined in claim 1 in which up to fifty percent of the diepoxide compounds do not contain the cleavable linear acetal group.

3. The diepoxide composition of claim 1 in which said 1,3-diaza compound is selected from the group consisting of: imidazole; 2-ethyl-4-methylimidazole; 2-methylimidazole; 5-methylimidazole; 4-methylimidazole; 2-ethylimidazole.

4. The diepoxide composition of claim 1 in which the cyclic anhydride or mixture of cyclic anhydrides are selected from the group consisting of: hexahydrophthalic anhydride, tetrahydrophthalic anhydride, methyltetrahydrophthalic anhydride, methylhexahydrophthalic anhydride, dodecylsuccinic anhydride, nadic anhydride, nadic methyl anhydride, trimellitic anhydride, and maleic anhydride.

5. The diepoxide composition defined in claim 1 which said acetal diepoxide is acetaldehyde bis-(3,4-cyclohexylmethyl) diepoxide.

* * * * *